US010158900B1

(12) United States Patent
Siddiq et al.

(10) Patent No.: US 10,158,900 B1
(45) Date of Patent: Dec. 18, 2018

(54) SYSTEMS AND METHODS FOR DETECTING AND CORRELATING SCHEDULE-RELATED INFORMATION IN AN ELECTRONIC DOCUMENT TO GENERATE A CALENDER SCHEDULE INDICATOR

(71) Applicant: Rovi Guides, Inc., San Jose, CA (US)

(72) Inventors: Abubakkar Siddiq, Methuen, MA (US); Ganesh Ramamoorthy, Andover, MA (US); Sankar Ardhanari, Windham, NH (US); Sai Rahul Reddy Pulikunta, North Andover, MA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 15/720,607

(22) Filed: Sep. 29, 2017

(51) Int. Cl.
*H04N 21/262* (2011.01)
*H04N 21/482* (2011.01)
*H04N 21/235* (2011.01)
*H04N 21/435* (2011.01)
*G06F 17/30* (2006.01)

(52) U.S. Cl.
CPC .. *H04N 21/26283* (2013.01); *G06F 17/30011* (2013.01); *G06F 17/30625* (2013.01); *H04N 21/235* (2013.01); *H04N 21/435* (2013.01); *H04N 21/4821* (2013.01)

(58) Field of Classification Search
CPC .............. G06F 17/2217; H04N 21/26283
See application file for complete search history.

(56) References Cited

U.S. PATENT DOCUMENTS

| | | | |
|---|---|---|---|
| 6,239,794 B1 | 5/2001 | Yuen et al. | |
| 6,564,378 B1 | 5/2003 | Satterfield et al. | |
| 7,165,098 B1 | 1/2007 | Boyer et al. | |
| 7,668,813 B2* | 2/2010 | Baeza-Yates | G06F 17/30551 707/769 |
| 7,707,496 B1* | 4/2010 | Moore | G06F 17/2264 715/254 |
| 7,730,013 B2* | 6/2010 | Dill | G06F 17/30616 704/1 |
| 7,761,892 B2 | 7/2010 | Ellis et al. | |
| 8,046,801 B2 | 10/2011 | Ellis et al. | |
| 8,239,350 B1* | 8/2012 | Vespe | G06F 17/2217 707/687 |
| 2002/0174430 A1 | 2/2002 | Ellis et al. | |
| 2005/0251827 A1 | 7/2005 | Ellis et al. | |
| 2010/0153885 A1 | 6/2010 | Yates | |

OTHER PUBLICATIONS

"Gmail will now automatically add Google Calendar events for emails with flight, hotel, restaurant, or ticket info," BUSINESS, EMIL PROTALINSKI © EPRO Aug. 25, 2015.

* cited by examiner

*Primary Examiner* — Ricky Chin
*Assistant Examiner* — Jen-Shi Huang
(74) *Attorney, Agent, or Firm* — Haley Guiliano LLP

(57) ABSTRACT

Systems and methods for automatically detecting date information in electronic documents. In some embodiments, a media guidance application may automatically associate a first partial calendar date-and-time indicator to a second partial calendar date-and-time indicator that appears at a separate location in a document. The media guidance application may determine whether the partial calendar date-and-time indicators are correlated, and then combine the partial calendar date-and-time indicators to obtain a complete date-and-time representation.

20 Claims, 7 Drawing Sheets

| Date | MEX | COL | VEN | ARG | CHL | Title | Spanish Title | Genre | Year |
|---|---|---|---|---|---|---|---|---|---|
| 01 Jan | 22:00 | 23:00 | 00:00 | 01:00 | 01:00 | The Salvation | The Salvation | Drama | 2014 |
| | 23:35 | 00:35 | 01:35 | 02:35 | 02:35 | Twilight | Crepusculo | Drama | 2008 |
| | 01:10 | 02:10 | 03:10 | 04:10 | 04:10 | Gods of Egypt | Dioses de Egipto | Action | 2015 |
| | 02:50 | 03:50 | 04:50 | 05:50 | 05:50 | Daddy's Home | La Casa De Papa | Comedy | 2015 |
| | ... | ... | ... | ... | ... | ... | ... | ... | ... |
| 02 Jan | 22:00 | 23:00 | 00:00 | 01:00 | 01:00 | Kung Fu Panda | Kung Fu Panda | Action | 2014 |
| | ... | ... | ... | ... | ... | ... | ... | ... | ... |

| Date | MEX | COL | VEN | ARG | CHL | Title | Spanish Title | Genre | Year |
|---|---|---|---|---|---|---|---|---|---|
| 01 Jan | 22:00 | 23:00 | 00:00 | 01:00 | 01:00 | The Salvation | The Salvation | Drama | 2014 |
| | 23:35 | 00:35 | 01:35 | 02:35 | 02:35 | Twilight | Crepusculo | Drama | 2008 |
| | 01:10 | 02:10 | 03:10 | 04:10 | 04:10 | Gods of Egypt | Dioses de Egipto | Action | 2015 |
| | 02:50 | 03:50 | 04:50 | 05:50 | 05:50 | Daddy's Home | La Casa De Papa | Comedy | 2015 |
| | ... | ... | ... | ... | ... | ... | ... | ... | ... |
| 02 Jan | 22:00 | 23:00 | 00:00 | 01:00 | 01:00 | Kung Fu Panda | Kung Fu Panda | Action | 2014 |
| | ... | ... | ... | ... | ... | ... | ... | ... | ... |

FIG. 1

SYSTEMS AND METHODS FOR DETECTING AND CORRELATING SCHEDULE-RELATED INFORMATION IN AN ELECTRONIC DOCUMENT TO GENERATE A CALENDER SCHEDULE INDICATOR

BACKGROUND

Conventional systems may identify date information in an electronic document, and correlate the identified date information with a calendar platform. For example, when a user types in "I'll see you at 7 PM this Saturday" in an electronic mail, the electronic mail platform may identify keywords relating to date information such as "7 PM" and "Saturday," and may automatically put an event reminder on the calendar at 7 PM the coming Saturday. However, sometimes the date information may not be explicit in the text in an electronic document. For example, the date information may be implicit based on the context of the content of the electronic document, for example, the time, date, month and year information of the same event may appear at different places of the document, e.g., a document entitled "Program Schedule for July 31" may include a table listing time information for each program, e.g., "Game of Thrones—19:00," etc. Conventional systems, which only identify date information based on textual terms or strings having certain previously-defined date-and-time formats, e.g., "DD-MM-YYYY," "MMM DD, YYYY," "AM/PM," "Weekday," etc., are unable to identify and correlate the date of "July 31" that is indicated in the title of the document, and the time "19:00" that is indicated in a table within the document to identify and generate a complete calendar schedule indicator of "19:00, July 31."

SUMMARY

Systems and methods are described herein for automatically detecting date information in electronic documents. In some embodiments, the media guidance application may identify and correlate text strings inside and outside the document, which are indicators of calendar elements like year, month, fortnight, week, date. The media guidance application may arrange the various text strings in a hierarchical structure that also preserves the position information of the elements in the document. For example, the media guidance application may identify a first calendar element, e.g., the month, and may put it in a hierarchical structure. Subsequently the media guidance application may identify text strings that are indicators of partial dates, e.g., the day of month, fortnight, week or time of day, and may add the text strings to the hierarchical structure. Each text string is added to the structure following the closest previously seen calendar element in the document. Thus, in this way, the media guidance application may identify calendar information throughout a document, e.g., in the title of the document, in the footer of the document, etc., and correlate the distributed calendar information to generate a calendar schedule, even if the calendar information are distributed as different partial calendar elements that are not in a standard "dd/mm/yyyy" format or any other standard date format.

To this end and others, in some aspects of the disclosure, the media guidance application may receive an electronic document containing a first document object (e.g., the caption of a table, etc.) and a second document object (e.g., a cell in a table) defined under a structural document object model (e.g., eXtensible Markup Language (XML), etc.). The media guidance application may identify a first text string (indicative of first schedule-related information within the first document object and a second text string indicative of second schedule-related information within the second document object. The media guidance application may identify a first type (e.g., the year) of first schedule-related information from the first text string, and a second type (e.g., the month and date) of second schedule-related information from the second text string.

In some embodiments, the media guidance application may determine a first type of the first document object, and identify one or more data formats for schedule-related information corresponding to the type of the first document object. For example, schedule-related information may take a format of "MM-DD-YYYY" in the footer of a document. The media guidance application may determine whether the first text string is compliant with at least one of the one or more data formats. In response to determining that the first text string is compliant with the at least one of the one or more data formats, the media guidance application may identify that the first text string is indicative of first schedule-related information within the first document object.

In some embodiments, the media guidance application may parse the first text string based on the at least one data format that the first text string is compliant with to determine one or more calendar elements contained in the first text string, and associate a schedule-information type with each of the one or more calendar elements based on the at least one data format.

In some embodiments, the media guidance application may determine textual content corresponding to the first document object, e.g., the document may be related to a geographical area such as Europe. The media guidance application may perform a query within the textual content based on a plurality of previously stored terms relating to a calendar schedule (e.g., the name or acronym of a month in a language other than English, etc.). In response to the query, the media guidance application may detect the first text string within the first document object contains a first previously stored term relating to first schedule-related information.

In some embodiments, the media guidance application may add the first schedule-related information (e.g., the year of "2017") and information relating to the first document object (e.g., the caption of a table) to a first position in a hierarchical structure and the second schedule-related information (e.g., the month and date of "January 1") and information relating to the second document object (e.g., a cell in table) at a second position in the hierarchical structure. For example, the media guidance application may generate a first node corresponding to the first schedule-related information and a second node corresponding to the second schedule-related information and add the first node to the hierarchical structure at the first position representing the first type of first schedule-related information. Similarly, the media guidance application may generate and add the second node to the hierarchical structure at the second position representing the second type of second schedule-related information. The media guidance application may then annotate the first node with information relating to the first document object and a first location of the first document object within the electronic document, and the second node with information relating to the second document object and a second location of the second document object within the electronic document. The relative position between the first position and the second position in the hierarchical structure is indicative of a relationship between the first document object and the second document object in the document.

In some embodiments, the media guidance application may determine whether the hierarchical structure contains a third position indicative of third schedule-related information of the first type (e.g., another text string that indicates the year), and whether the third position is closer to the second position than the first position in the hierarchical structure. For example, the media guidance application may locate a third node at a first level where the first node is located in the hierarchical structure, e.g., another node corresponding to the year of "2016" in addition to the node corresponding to the year of "2017." In response to locating the third node at the first level where the first node is located in the hierarchical structure, the media guidance application may retrieve, from the third node, a third location within the electronic document where the third schedule-related information appears, and determine whether the third location is closer to the second location than the first location. For example, the media guidance application may apply a set of pre-defined rules to determine whether the third location is closer to the second location than the first location based on the first document object, the second document object and the third document object. For another example, the media guidance application may determine whether the third location is closer to the second location than the first location by comparing a first count of characters between the first location and the second location and a second count of characters between the third location and the second location.

In some embodiments, when the hierarchical structure contains a third position indicative of third schedule-related information of the first type and the third position is closer to the second position than the first position in the hierarchical structure, the media guidance application may identify the third schedule-related information and the second schedule-related information as relating to a same calendar event. The media guidance application may then generate a schedule indicator by combining the third schedule-related information and the second schedule-related information in compliance with a calendar schedule format. When the hierarchical structure contains no third position indicative of schedule-related information of the first type or the third position is not closer to the second position than the first position in the hierarchical structure, the media guidance application may identify the first schedule-related information and second schedule-related information as relating to the same event. The media guidance application may generate a schedule indicator by combining the first schedule-related information and the second schedule-related information in compliance with a calendar schedule format.

In some embodiments, the media guidance application, in response to determining that the hierarchical structure contains a third position indicative of third schedule-related information of the first type and the third position is closer to the second position than the first position in the hierarchical structure, the media guidance application may determine a context of the first document object and second document object based on at least partial content of the first document object and the second document object, e.g., the content of the document that may indicate which schedule-related information is to be combined. The media guidance application may then identify whether the first schedule-related information and second schedule-related information are related to the same event based on the context, even if the third schedule-related information may be closer to the second schedule-related information on the hierarchical structure.

In some embodiments, the media guidance application may determine metadata associated with the electronic document, and extract time information from the metadata (e.g., the name of the document, a time zone where the document was created, etc.). The media guidance may translate the time information to fourth schedule-related information having a fourth type, and add a node corresponding to the fourth schedule-related information to the hierarchical structure to determine whether any other nodes have schedule-related information to be combined with the fourth schedule-related information.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 1 depicts an illustrative diagram showing an example television program table on which the media guidance application may automatically detect date or time information from the tabular data, in accordance with some embodiments of the disclosure;

DETAILED DESCRIPTION

Figure 2:
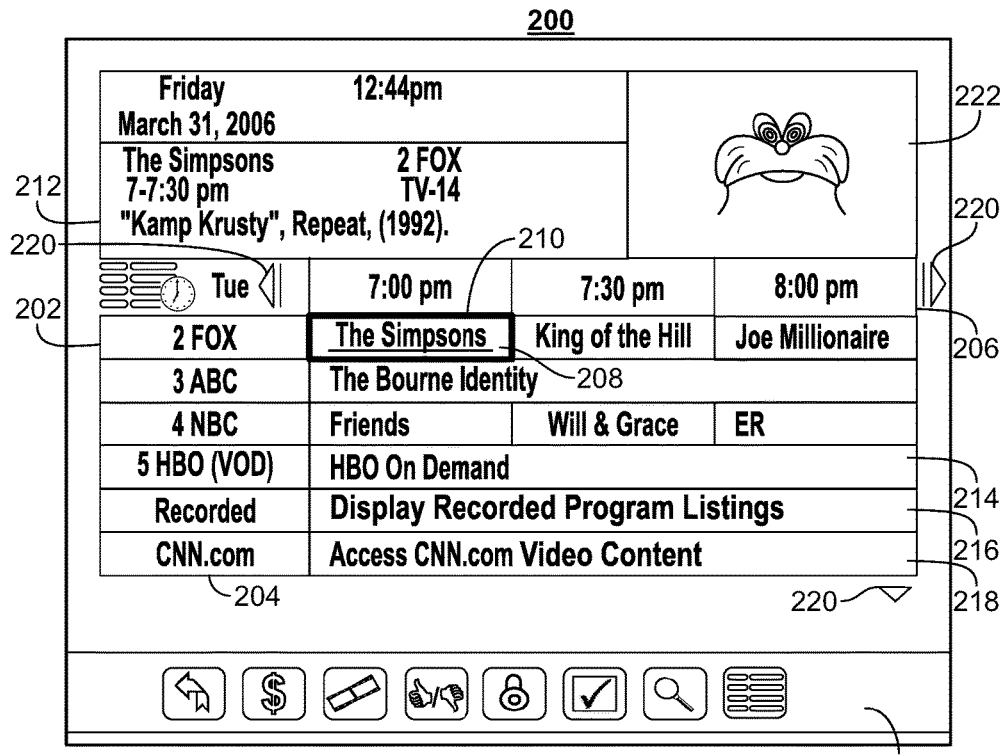
FIG. 2 shows an illustrative embodiment of a display screen that may be used to provide media guidance application listings and other media guidance information, in accordance with some embodiments of the disclosure.

Systems and methods are described herein for automatically detecting date information in electronic documents. In some embodiments, a media guidance application may be engaged to automatically interpret text string that represents dates in a document. For example, the media guidance application may identify schedule information, e.g., in a "dd/mm/yyyy" format, etc. The media guidance application may evaluate various factors to determine a possible date information format that is used in the document, such as but not limited to language of the document, references to locations, a correlation between multiple date-related information found in the text string, and references to dates in other formats that may indicate the month (e.g., "Nov 2016") or day of the week (e.g., "Thursday, 10/11/16"), and/or the like. In some embodiments, the media guidance application may automatically associate an unambiguous calendar date or time to a text string that includes partial information of a date and time in the document. For example, the media guidance application may recursively add other schedule-related information or calendar elements from the document occurring in a hierarchically closest position to the text string that includes partial information of a date and time, until a complete date-and-time representation is created.

For example, the media guidance application may identify that a paragraph in a document includes a date of "January 1," and then identify that the name of the document is "Broadcast schedule for 2017." Although the date of "January 1" and the year of "2017" appear at different locations of the document, or even belong to different document objects of the document (e.g., the body of the document and the name of the document), the media guidance application may combine the two pieces of information to identify a calendar schedule as "Jan. 1, 2017." Thus, in this way, the media guidance application may detect and correlate schedule-related information that is distributed at different portions of the document, such as different document objects, or even in the metadata, to determine a complete and unambiguous calendar date-and-time indicator, even if the text string of the document does not explicitly recite the complete and unambiguous calendar date and time.

As used herein, the term "schedule-related information," "date information" or "calendar element" is defined to mean any alphabetical, alphanumeric, or numeric text string that is indicative of a calendar year, month, fortnight, week, a date of a month, a day of a week, a time of the day, a time instance, a time zone, and/or the like. As used herein, the term "document object" is defined to mean a container of a section of document content, and the container is defined by a structured document model, such as but not limited to eXtensible Markup Language (XML), Java, and/or the like. A document object may include but not limited to the title of a document, a paragraph of a document, a table within the document, a header of the document, and/or the like. As used herein, the term "media guidance application" is defined to mean an application that provides guidance for a user to select or control the playing of a media asset or content. Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

It is to be noted that embodiments described herein may be implemented by a media guidance application, or any other tool that is capable of receiving, and parsing information from an electronic document.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), notification information (e.g., text, images, media clips, etc.), on-demand information, blogs, websites, and any other type of guidance data that is helpful for a user to navigate among and locate desired content selections.

In some embodiments, control circuitry 404, discussed further in relation to FIG. 4 below, executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays discussed in relation to FIGS. 2-3. In some implementations, any action performed by control circuitry 404 may be based on instructions received from the media guidance application.

As referred to herein, the term "in response to" refers to initiated as a result of. For example, a first action being performed in response to a second action may include interstitial steps between the first action and the second action.

FIG. 1 depicts an illustrative diagram showing an example television program table on which the media guidance application may automatically detect date or time information from the tabular data, in accordance with some embodiments of the disclosure. The media guidance application may receive, e.g., via the I/O path 402 as further described in FIG. 4, an electronic document containing a first text string indicative of a first part of date information at a first place within the electronic document and a second text string indicative of a second part of date information at a second place within the electronic document, e.g., from media guidance data source 518 via communication networks 514 in FIG. 5 as further discussed in relation to FIG. 5. For example, the electronic document may include a format compatible with Microsoft Word, Adobe Acrobat, Microsoft Excel, Powerpoint, a Hypertext Transfer Protocol (HTTP) document, and/or the like. For example, the electronic document may contain a television program schedule table 100 including a first cell "01-Jan" 102 under column "Date" 101 and a second cell "22:00" 104 under column "MEX" 103.

In some embodiments, the media guidance application may determine a type of the document object, and identify one or more data formats for schedule-related information corresponding to the type of the document object. For example, schedule-related information may take a format of "MM-DD-YYYY" in the footer of a document. For another example, schedule-related information in the body of the text of the document may take a format of "Month DD, YYYY." The media guidance application may determine whether the text string is compliant with at least one of the one or more data formats. In response to determining that the text string is compliant with the at least one of the one or more data formats, the media guidance application may identify that the text string is indicative of schedule-related information within the document object.

For example, The media guidance application may parse the text string based on the at least one data format that the first text string is compliant with to determine one or more calendar elements contained in the first text string, and associate a schedule-information type with each of the one or more calendar elements based on the at least one data format. For example, the media guidance application may identify "01-Jan" 102 as related to the date of an event. Similarly, the media guidance application may identify the second part of date information from the second text string, e.g., identifying "22:00" 104 as related to the time of an event.

For example, the media guidance application may query for schedule-related information within the document based on a plurality of date formats. The plurality of date formats may include, but not limited to any of: use of separators (e.g., "10.11.2016," "10/11/2016," "10-11-2016," etc.), use of different numbers of digits for years (e.g., "10/11/2016," "10/11/16," etc.), use of different numbers of digits for date or month (e.g., "1/4/16," "01/04/16," etc.), use of different orders of digits representing date, month or year (e.g., mm/dd/yy, dd/mm/yy, yy/mm/dd, yy/dd/mm, etc.), and/or the like.

Figure 4:
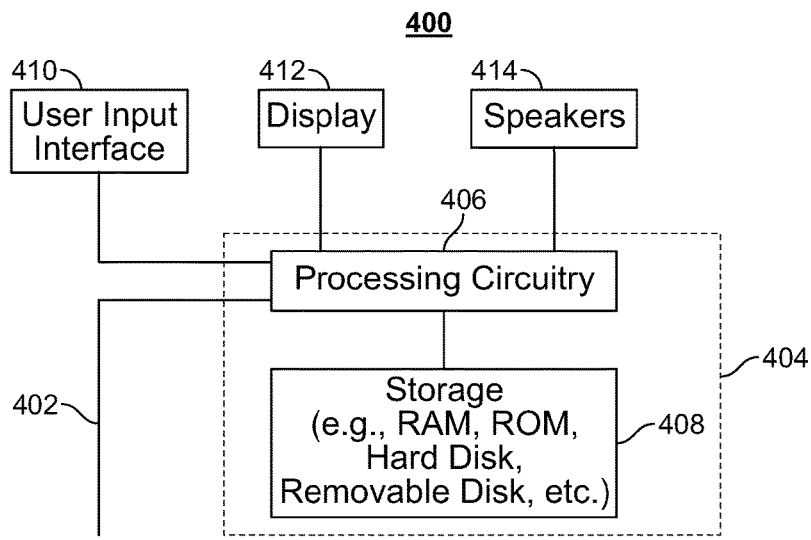
FIG. 4 is a block diagram of an illustrative user equipment (UE) device in accordance with some embodiments of the disclosure.
Figure 5:
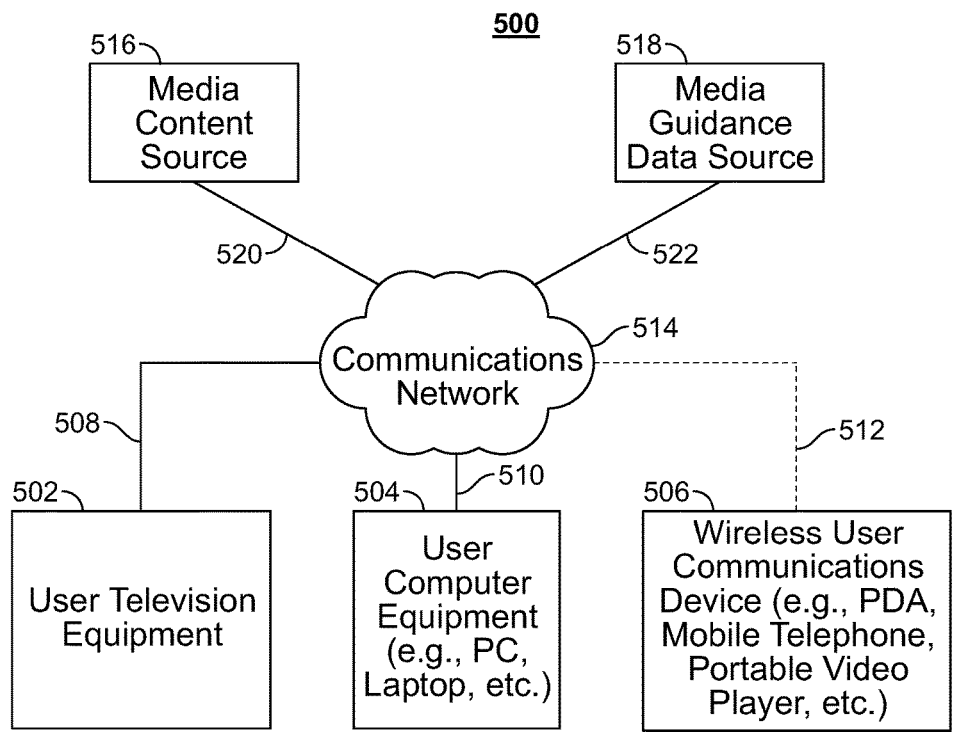
FIG. 5 is a block diagram of an illustrative media system in accordance with some embodiments of the disclosure.

To identify the partial schedule-related information, the media guidance application may determine textual content corresponding to the document object, e.g., the document may be related to a geographical area such as Europe, and determine a context of textual content of the electronic document, based on which the media guidance application may determine a plurality of previously stored terms relating to date or time in a certain format that may be used in the electronic document, e.g., stored at storage 404 in FIG. 4, or media guidance data source 518, which can be obtained via communication networks 514 in FIG. 5. The media guidance application may perform a query within the textual content based on a plurality of previously stored terms relating to a calendar schedule (e.g., the name or acronym of a month in a language other than English, etc.). In response to the query, the media guidance application may detect the first text string within the first document object contains a first previously stored term relating to first schedule-related information. For example, the media guidance application may extract textual content of the document, and determine a language of the document. If the document is written in a non-English European language, the media guidance application may determine a date format of "dd/mm/yyyy" may be used in the document. In addition, the media guidance application may identify GPS information contained in the metadata of the document, references to locations that the document was written in or for, and/or the like. For example, if the document is in a Spanish language document and references South America, the media guidance application may determine a date format of "dd/mm." For another example, if the media guidance application detects the document is written in Spanish but references a U.S. location, the media guidance application may determine that a date format of "mm/dd" may be used in the document.

In another example, the media guidance application may determine a correlation between multiple date-related indicators found in the text string. For example, in a table where sequential calendar dates are presented, the media guidance application may identify the frequency of change of the digits in a subpart of the format to determine what format of date is being used in the document. If the first subpart changes in every subsequent calendar day (e.g., "10/11/16, 11/11/16, 12/11/16," etc.), the media guidance application may determine that the format being used is "dd/mm/yyyy." In another example, if the dates were presented as "11/10/16, 11/11/16, 11/12/16, etc.," with the subpart changes happening in the two middle digits, then the format being used is "mm/dd/yy."

In another example, the media guidance application may identify references to date-related indicators in the document that are not in a standard date or time format, e.g., not in a "dd/mm/yy" or "mm/dd/yyyy" format. For example, a date in the header of a document that has schedule or calendar information, like "Nov 2016", identifies the month for all the dates in the document. So "10/11" or "11/10" may both represent 10th November 2016. In another example, the media guidance application may identify references to dates in other formats that give clues to day of the week. For example, if the date has the day information, e.g., "Thursday, 10/11/16" then by using the calendar, the media guidance application may identify that 10th November 2016 is a Thursday, while 11th October 2016 is a Tuesday. Thus the media guidance application may identify that the format being used for representing dates in the document is "dd/mm/yy" instead of "mm/dd/yy."

In some embodiments, the media guidance application may perform a query within textual content of the electronic document based on a plurality of previously stored terms relating to date or time, e.g., the identified data and time format that is being used in the document as described above. In response to the query, the media guidance application may detect that the first text string at the first place contains the first part of schedule-related information, and that the second text string at the second place contains the second part of schedule-related information. At times, the first place and the second place may be at separate places or positions within the document, e.g., not within a same sentence, in separate paragraphs, in different cells of a table, in different tabs within the same spreadsheet, in different tables within the same document, etc. In some implementations, the first place and the second place may belong to different documents. For example, the media guidance application may determine that the first place and the second place that belong to two different documents may be related based on a relevance between the two documents (e.g., similar titles, attachments in the same email trail, etc.).

In some embodiments, the media guidance application may determine whether the first part of the schedule-related information and the second part of the schedule-related information are correlated, e.g., whether the date "1 Jan. 2017" and the time "22:00" are related to the same event, and thus are to be generated as a complete calendar indicator that includes the date and the time. The media guidance application may establish or retrieve a hierarchical structure, e.g., from storage 408 described in relation to FIG. 4. The hierarchical structure includes levels of schedule-related information including a level representing the year, a level representing the month, a level representing the date, a level representing the time, and/or the like. For example, the media guidance application may add the first schedule-related information (e.g., the date of "Jan 1") and information relating to the first document object (e.g., cell 102 of table 100) to a first position in a hierarchical structure (e.g., as illustrated in one implementation by Table 1), and the second schedule-related information (e.g., the year of "2017") and information relating to the second document object (e.g., the caption of the table) at a second position in the hierarchical structure. For another example, the media guidance application may arrange the first part of schedule-related information (e.g., "01-Jan" 102) and information relating to the first place (e.g., row 2, column 1 of table 100), the second part (e.g., "22:00" 104) and information relating to the second place (e.g., row 2, column 2 of the table 100) in the hierarchical structure. An example hierarchical structure including the schedule-related information in the above example is illustrated in Table 1.

TABLE 1

| Example Hierarchical Structure | | | |
| --- | --- | --- | --- |
| | Info | Object | Place |
| Year | 2017 | Caption of Table | Table 1, page 1 |
| Month | January | Table Cell | Row 2, column 1, Table 1, page 1 |
| Date | 1 | Table cell | Row 2, column 1, Table 1, page 1 |
| Time | 22:00 | Table cell | Row 2, column 2, Table 1, page 1 |
| ... | ... | ... | ... |

Figure 7:
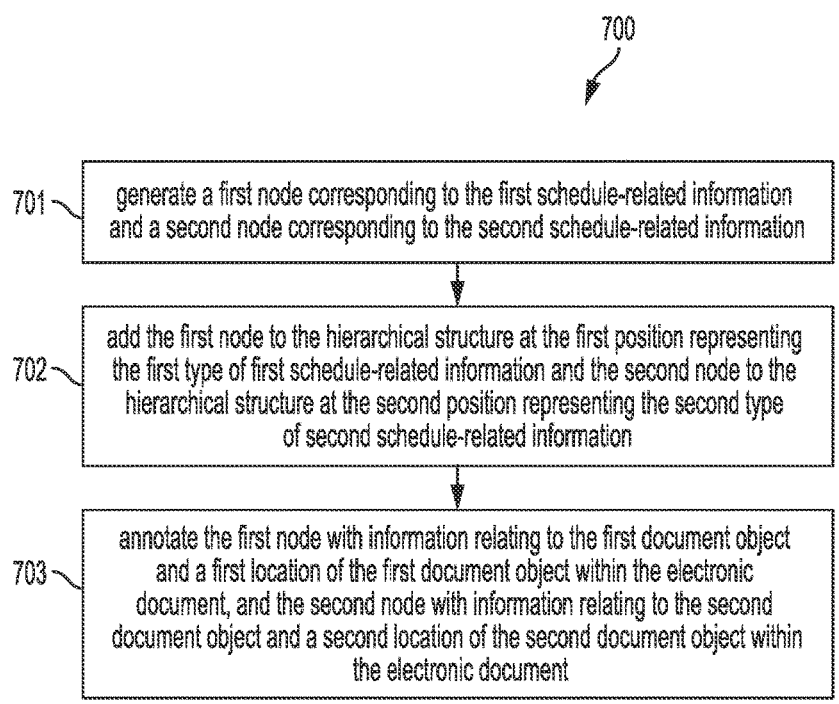
FIG. 7 depicts an illustrative flowchart of a process for adding schedule-related information and information relating to the document objects to a position in a hierarchical structure, in accordance with some embodiments of the disclosure.

Further discussion relating to adding information to the hierarchical structure is described in relation to FIG. 7.

The media guidance application may determine whether the first part of schedule-related information (e.g., the year of "2017") and the second part of schedule-related information (e.g., the date of "01 Jan") relate to a same event based at least in part on a relative position of the first place and the second place. For example, the media guidance application may extract date information from table 100, and then put date information "01-Jan" 102 (and the position of "01-Jan-2017" in table 100) at a hierarchical level designated for event dates, and time information 104 "22:00" (and the position of "22:00" in table 100) at a hierarchical level designated for event time. In one embodiment, the media guidance application may identify date information "01-Jan" 102 and time information 104 "22:00" from table 100 by automatically detecting semantics of table 100, which is discussed in further detail in co-pending and commonly-assigned U.S. patent application Ser. No. 15/720,776, filed on the same day, which is hereby expressly incorporated by reference herein in its entirety.

In some embodiments, the media guidance application may identify calendar elements which may not be part of the content of the document, e.g., from the file name or metadata along with the electronic document. For example, the media guidance application may identify calendar information "Jan 2017" from a file name "Jan 2017 Television Schedule." For another example, when the document does not contain an indicator for certain types of the schedule-related information, e.g., the year or month, the media guidance application may automatically associate the current year and current month with the document, e.g., by generating, for display, a suggestion of the current year and month. For another example, the media guidance application may associate the current year and the current month with a context of the content and/or schedule-related information within the document. For instance, when the media guidance application determines that the current year and month is in the last week of December, and the media guidance application determines that the document include schedule-related information indicating the month January, the media guidance application may designate the following year to be combined with the month of January.

In some embodiments, the media guidance application may determine whether the first part of schedule-related information represents a closest previously seen date information element to the second part of schedule-related information from textual content of the electronic document. The media guidance application may determine whether the hierarchical structure contains another node indicative of schedule-related information having the same type with the first or the second part of schedule-related information. For example, when Table 100 includes a cell indicating the year of "2016" in the same row of cell 102, the media guidance application may recognize that the cell of "2016" is closer to the cell of "01 Jan" when the two cells are within the same row of the same table, and may generate a calendar date of "1 Jan. 2016," instead of using the year "2017" indicated in the caption of table 100. For another example, within the hierarchical structure, the media guidance application may place "01-Jan" and "22:00" at positions, which represent that "01-Jan" is the closest previously seen calendar element to "22:00" and may be combined to form a complete date-and-time indicator.

In some embodiments, the media guidance application may retrieve a set of pre-defined rules, e.g., from storage 408 described in relation to FIG. 4, or data source 518 accessed via communications network 514 described in relation to FIG. 5, to determine which locations inside the document corresponding to different nodes at different levels of the hierarchical structure are the closest. For example, the set of pre-defined rules prescribes that a cell in the table is closer to another cell in the same table than any text outside the table. For another example, the set of pre-defined rules may prescribe that the title of the table is closer to a cell in the same table than the title of the document, or the name of the document. In another example, the set of pre-defined rules prescribes that the number of characters between two locations within the document indicate a distance between the locations.

In some embodiments, the media guidance application may determine whether the first part of schedule-related information and the second part of schedule-related information each represent a different type of element in a complete date-and-time indicator. For example, the media guidance application may determine whether the first place and the second place belong to a same document object (e.g., a paragraph, a same row/column in a table, etc.) within the electronic document. In the respective example, for cell "01-Jan" 102 and cell "23:00" 105, although "01-Jan" 102 is not the closest previously seen calendar element to "23:00" 105, the media guidance application may identify that "01-Jan" 102 represents a date, and "23:00" 105 represents a time, and the two cells are placed within the same row of table 100. Thus the media guidance application may determine that "01-Jan" 102 and "23:00" 105 may be combined to form a complete date-and-time indicator.

In response to determining that the first place and the second place belong to the same document object within the electronic document, the media guidance application may determine a context of the document, and correlate the determined context with the date-and-time indicator. In response to determining that the first part of date information and the second part and information relate to the same event, the media guidance application may generate a date-and-time indicator combining the first part of schedule-related information and the second part of schedule-related information compliant with a date-and-time format. For example, the media guidance application may combine "1 Jan. 2017" and "22:00" to be "22:00, 1 Jan. 2017." For another example, the media guidance application may determine a context of table 100 to identify that "22:00" 104 belongs to a column under header "MEX" 103. Thus the media guidance application may generate a complete date-and-time indicator "1 Jan. 2017, 22:00 Mexico time." Determination of the header row and semantics of columns of table 100 can be found in co-pending and commonly-assigned U.S. Provisional application no. 15/720,776, filed on the same day, which is hereby expressly incorporated by reference herein in its entirety.

Figure 3:
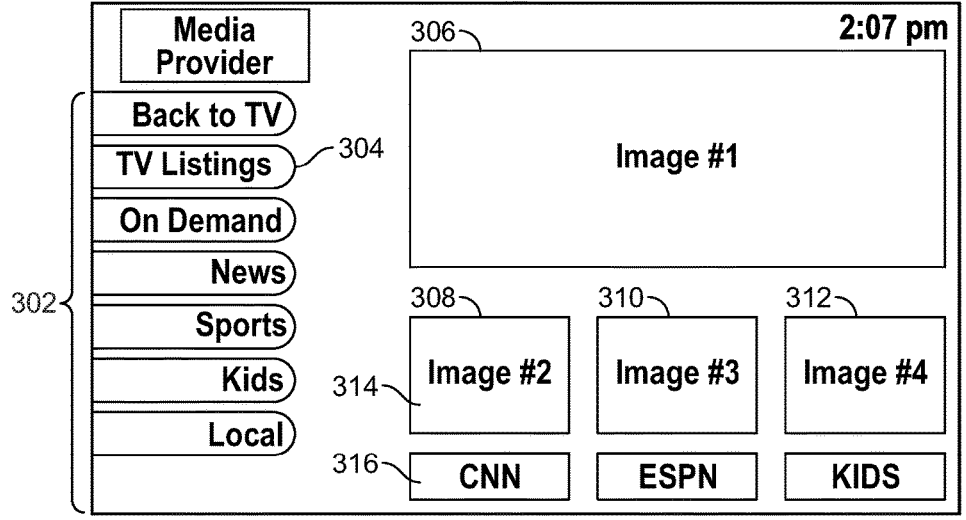
FIG. 3 shows another illustrative embodiment of a display screen that may be used to provide media guidance application listings, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

It should be noted that embodiments described in relation to FIG. 1 or any step thereof could be performed on, or provided by, any of the devices shown in, or described with respect to, FIGS. 4-5. For example, any of processes discussed in relation to FIG. 1 may be executed by control circuitry 404 (FIG. 4) as instructed by control circuitry implemented on user equipment 502, 504, 506 (FIG. 5) for automatically determining date and time information from an electronic document.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

Figure 6:
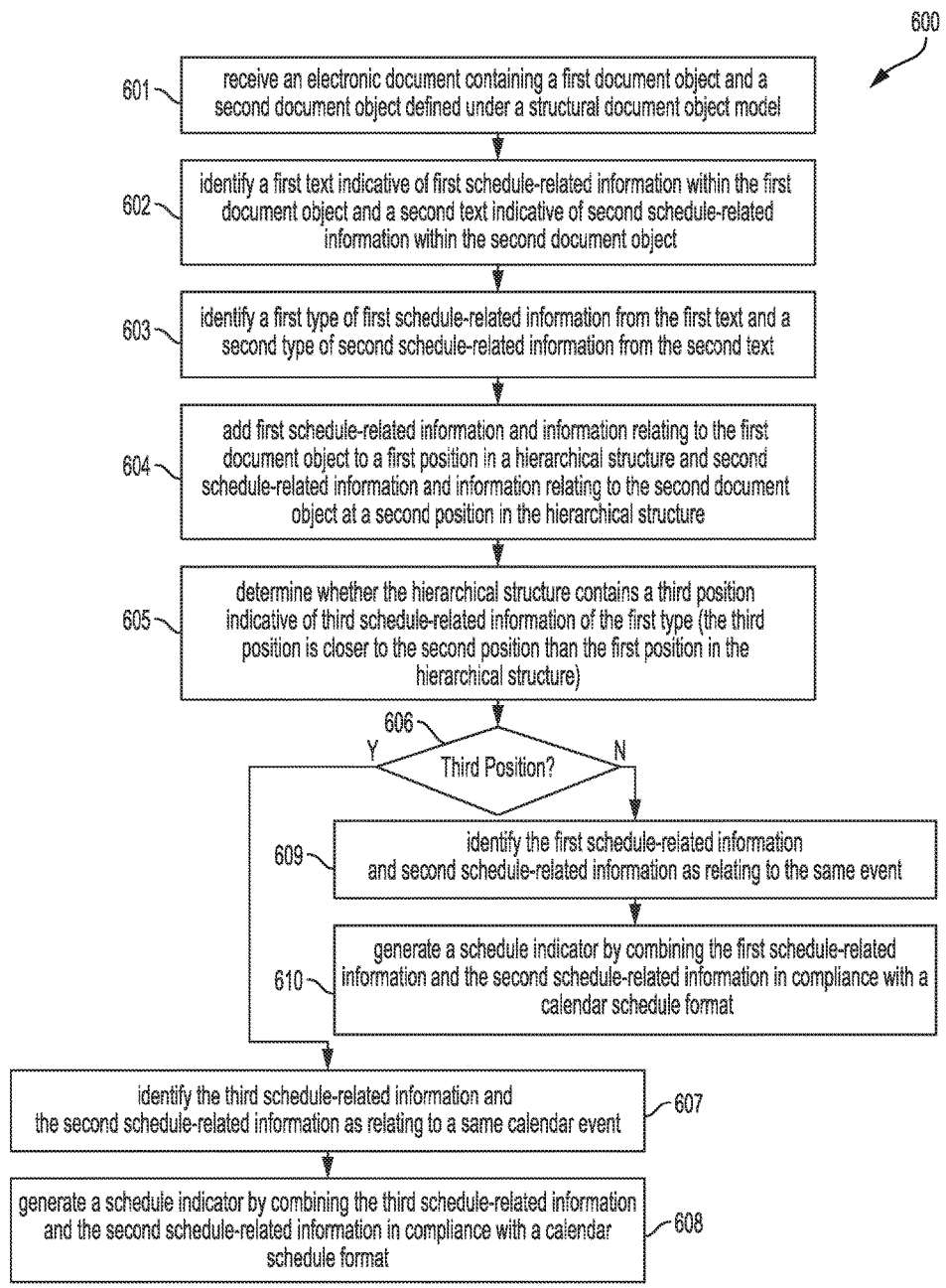
FIG. 6 depicts an illustrative flowchart of a process for automatically detecting and correlating date information in an electronic document to generate a calendar schedule indicator, in accordance with some embodiments of the disclosure.

FIG. 6 depicts an illustrative flowchart of a process for automatically detecting and correlating date information in an electronic document to generate a calendar schedule indicator, in accordance with some embodiments of the disclosure. Process 600 may be executed by control circuitry 404 (e.g., in a manner instructed to control circuitry 404 by the media guidance application). Control circuitry 404 may be part of user equipment (e.g., user television equipment 502, user computer equipment 504, and/or wireless communications device 506), or of a remote server separated from the user equipment by way of communications network 514.

Process 600 begins at 601, where control circuitry 404 receives, e.g., via the I/O path 402 described in FIG. 4, an electronic document containing a first document object (e.g., the title of the document, etc.) and a second document object (e.g., a cell 102 of table 100 in FIG. 1) defined under a structural document object model. At 602, control circuitry 404 identifies a first text string (e.g., "01 Jan" from cell 102 in FIG. 1) indicative of first schedule-related information within the first document object and a second text string (e.g., "2017" from the caption of the table) indicative of second schedule-related information within the second document object. At 603, control circuitry 404 identifies a first type of first schedule-related information from the first text string, and a second type of second schedule-related information from the second text string. For example, control circuitry 404 may identify "01 Jan" from cell 102 in FIG. 1, which indicates a date, and "2017" from the caption of the table, which indicates a year.

At 604, control circuitry 404 adds the first schedule-related information (e.g., the date of "Jan 1") and information relating to the first document object (e.g., cell 102 of table 100 in FIG. 1) to a first position in a hierarchical structure (e.g., as illustrated in one implementation by Table 1) and the second schedule-related information (e.g., the year of "2017") and information relating to the second document object (e.g., the caption of the table) at a second position in the hierarchical structure. For example, the pre-defined hierarchical structure is stored in storage 408 in FIG. 4, or data source 518 accessed via communications network 514 in FIG. 5. The relative position between the first position and the second position in the hierarchical structure is indicative of a relationship between the first document object and the second document object in the document. In this example, the first position that corresponds to cell 102 in table 100 is placed closer to a position that corresponds to cell 104 in table 100 than the second position that corresponds to the caption of the table, because cell 102 and cell 10memory4 are both cells within the same table 100. An example implementation of 604 is further described in relation to FIG. 7. At 605, control circuitry 404 determines whether the hierarchical structure contains a third position indicative of third schedule-related information of the first type (e.g., a year of "2016" in a different table, or in the text outside table 100 in the document), and whether the third position is closer to the second position than the first position in the hierarchical structure, which is further described in relation to FIG. 8.

At 606, process 606 continues to 607, when the hierarchical structure contains a third position indicative of third schedule-related information of the first type and the third position is closer to the second position than the first position in the hierarchical structure. At 607, control circuitry 404 identifies the third schedule-related information and the second schedule-related information as relating to a same calendar event. At 608, control circuitry 404 generates a schedule indicator by combining the third schedule-related information and the second schedule-related information in compliance with a calendar schedule format. For example, when the third schedule-related information includes a year of "2016" in a cell of table 100, control circuitry 404 may recognize that the cell of "2016" is closer to the cell of "01 Jan" when the two cells are within the same row of the same table, and may generate a calendar date of "1 Jan. 2016," instead of using the year "2017" indicated in the title of table 100.

At 606, process 505 continues to 609, when the hierarchical structure contains no third position indicative of schedule-related information of the first type or the third position is not closer to the second position than the first position in the hierarchical structure. At 609, control circuitry 404 identifies the first schedule-related information and second schedule-related information as relating to the same event. At 610, control circuitry 404 generates a schedule indicator by combining the first schedule-related information and the second schedule-related information in compliance with a calendar schedule format. For example, when the third schedule-related information includes a year of "2016" in the text outside table 100 in FIG. 1, control circuitry 404 may determine that the text string "2016" is not closer to the cell of "01 Jan" 102 in table 100 than the caption of table 100 that includes "2017," because the caption and cell 102 of table 100 are both relating to the same table. In this case, control circuitry 404 generates a calendar date of "1 Jan. 2017," instead of using the year "2016" indicated in the text outside of table 100.

FIG. 7 depicts an illustrative flowchart of a process for adding schedule-related information and information relating to the document objects to a position in a hierarchical structure (see 604 in FIG. 6), in accordance with some embodiments of the disclosure. Process 600 may be executed by control circuitry 404 (e.g., in a manner instructed to control circuitry 404 by the media guidance application). Control circuitry 404 may be part of user equipment (e.g., user television equipment 502, user computer equipment 504, and/or wireless communications device 506), or of a remote server separated from the user equipment by way of communications network 514.

Process 700 begins at 701, where control circuitry 404 inherits all the process parameters from 603 in FIG. 6, such as but limited to the first type of the first schedule-related information, and the second type of the second schedule-related information, which is retrieved from storage 408 in FIG. 4. At 701, control circuitry 404 generates a first node corresponding to the first schedule-related information and a second node corresponding to the second schedule-related information. For example, control circuitry 404 may allocate a memory address in storage 408 for each of the first node and the second node to store the respective schedule-related information and the respective position within the electronic document where the schedule-related information is located. At 702, control circuitry 404 adds the first node to the hierarchical structure at the first position representing the first type of first schedule-related information and the second node to the hierarchical structure at the second position representing the second type of second schedule-related information. For example, control circuitry 404 generates a pointer to connect the allocated memory address to other memory addresses in storage 408 corresponding to other nodes in the hierarchical structure. In the above example, for a node generated to represent the date of "01 Jan," control circuitry 404 connects the memory address storing the node with other nodes storing date information as on the same level in the hierarchical structure.

At 703, control circuitry 404 annotates the first node with information relating to the first document object and a first location of the first document object within the electronic document, and the second node with information relating to the second document object and a second location of the second document object within the electronic document, and the annotated information is saved with the hierarchical structure in storage 408. For example, the node corresponding to the date of "01 Jan" is annotated with the place in the document as "column 1; row 1; Table 1; page 1."

Figure 8:
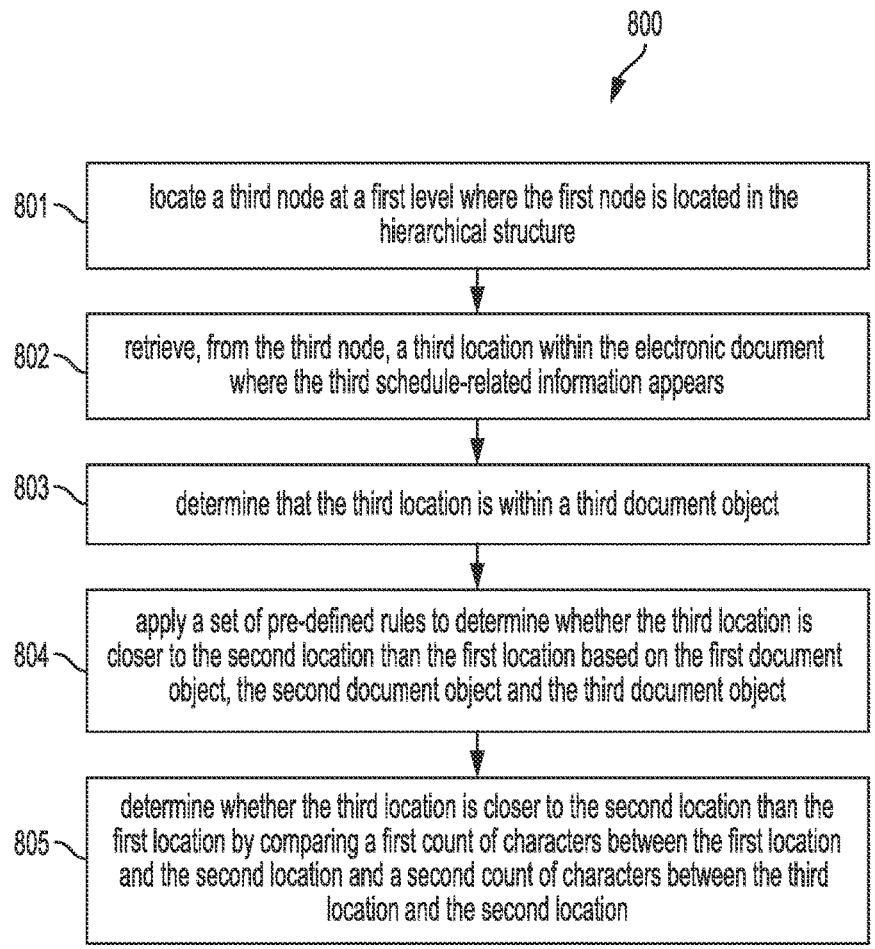
FIG. 8 depicts an illustrative flowchart of a process for determining whether the hierarchical structure contains a third position indicative of third schedule-related information of the first type and whether the third position is closer to the second position than the first position, in accordance with some embodiments of the disclosure.

FIG. 8 depicts an illustrative flowchart of a process for determining whether the hierarchical structure contains a third position indicative of third schedule-related information of the first type and whether the third position is closer to the second position than the first position (see 605 in FIG. 6), in accordance with some embodiments of the disclosure. Process 800 may be executed by control circuitry 404 (e.g., in a manner instructed to control circuitry 404 by the media guidance application). Control circuitry 404 may be part of user equipment (e.g., user television equipment 502, user computer equipment 504, and/or wireless communications device 506), or of a remote server separated from the user equipment by way of communications network 514.

Process 800 begins at 801, where control circuitry 404 locates a third node at a first level where the first node is located in the hierarchical structure. In the example discussed in relation to FIG. 6, control circuitry 404 may identify a node corresponding to the year of "2016" in addition to the node corresponding to the year of "2017," which are both on the level of year in the hierarchical structure. At 802, in response to locating the third node at the first level where the first node is located in the hierarchical structure, control circuitry 404 retrieves, from the third node, a third location within the electronic document where the third schedule-related information appears, e.g., the node corresponding to the year of "2016" is associated with the place of "caption; Table 1; page 1." At 803, control circuitry 404 determines whether the third location is closer to the second location than the first location. In one implementation, at 804, control circuitry 404 applies a set of pre-defined rules to determine whether the third location is closer to the second location than the first location based on the first document object, the second document object and the third document object. For example, the set of pre-defined rules prescribes that a cell in the table is closer to another cell in the same table than any text outside the table. For another example, the set of pre-defined rules prescribes that the title of the table is closer to a cell in the same table than the title of the document, or the name of the document.

At 805, in another implementation, control circuitry 404 determines whether the third location is closer to the second location than the first location by comparing a first count of characters between the first location and the second location and a second count of characters between the third location and the second location. For example, a cell in the table is closer to the title of the same table than the title of the document, as there are fewer characters between the cell and the title of the table than the characters between the cell and the title of the document, which is usually at the beginning of the document.

Figure 9:
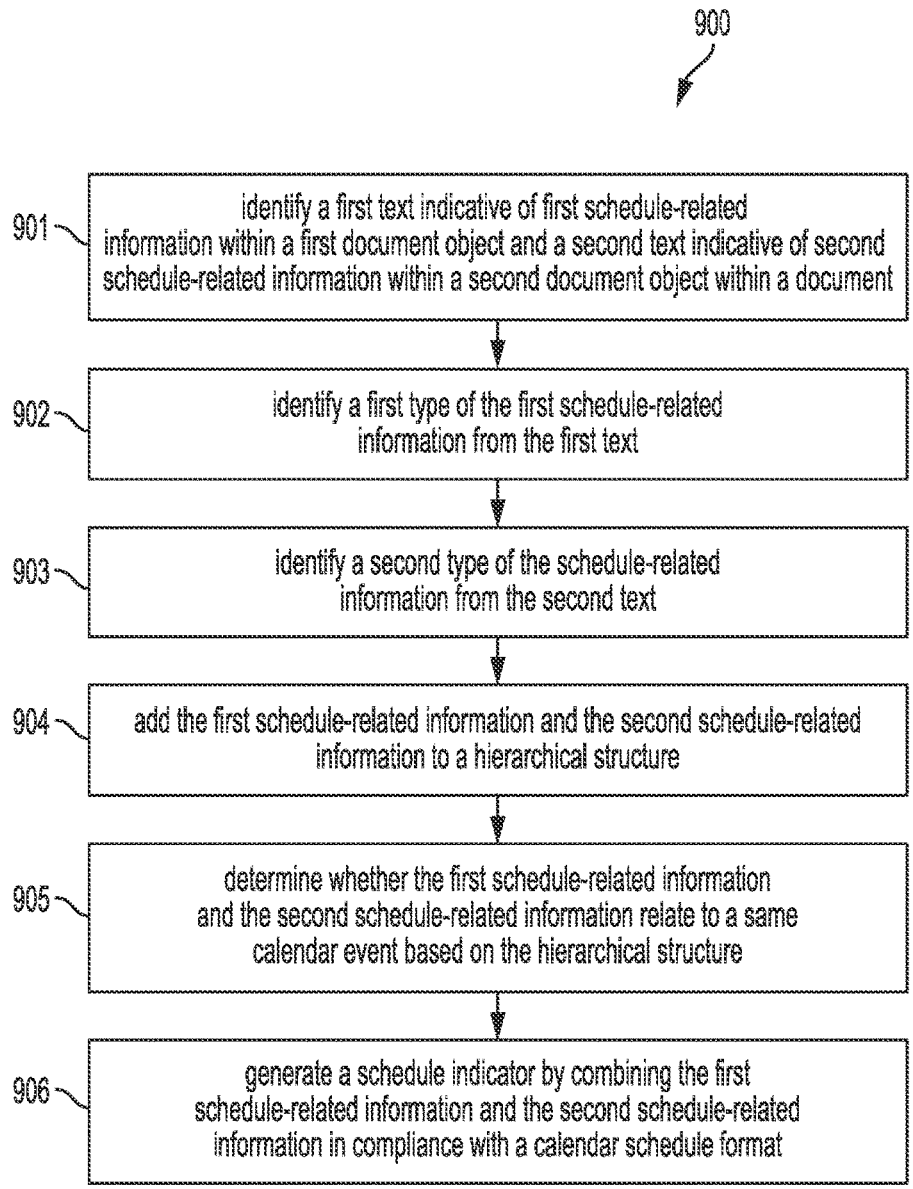
FIG. 9 depicts an illustrative flowchart of a process for detecting schedule-related information in an electronic document, in accordance with some embodiments of the disclosure.

FIG. 9 depicts an illustrative flowchart of a process for detecting schedule-related information in an electronic document, in accordance with some embodiments of the disclosure. Process 900 may be executed by control circuitry 404 (e.g., in a manner instructed to control circuitry 404 by the media guidance application). Control circuitry 404 may be part of user equipment (e.g., user television equipment 502, user computer equipment 504, and/or wireless communications device 506), or of a remote server separated from the user equipment by way of communications network 514.

Process 900 begins at 901, where control circuitry 404 identifies a first text string indicative of first schedule-related information within a first document object and a second text string indicative of second schedule-related information within a second document object within a document, e.g., the date of "01 Jan" in a table and the year of "2017" in the caption of the table, as discussed in relation to FIG. 6. At 902, Control circuitry 404 identifies a first type of the first schedule-related information from the first text string. At 903, control circuitry 404 identifies a second type of the second schedule-related information from the second text string. At 904. control circuitry 404 adds the first schedule-related information and the second schedule-related information to a hierarchical structure. At 905, control circuitry 404 determines whether the first schedule-related information and the second schedule-related information relate to the same calendar event based on the hierarchical structure. At 906, in response to determining that the first schedule-related information and the second schedule-related information relate to the same calendar event, control circuitry 404 generates a schedule indicator by combining the first schedule-related information and the second schedule-related information in compliance with a calendar schedule format.

It is contemplated that the steps or descriptions of each of FIGS. 1-9 may be used with any other embodiment of this disclosure. In addition, the steps and descriptions described in relation to FIGS. 1-9 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-5 could be used to perform one or more of the steps described herein.

It will be apparent to those of ordinary skill in the art that methods involved in the present disclosure may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. For instance, annotating each respective portion of the media asset may be performed, e.g., by processing circuitry 406 of FIG. 4. The processing circuitry, for instance, may be a general purpose processor, a customized integrated circuit (e.g., an ASIC), or a field-programmable gate array (FPGA) within user equipment 400, media content source 516, or media guidance data source 518. For example, each data format of date or time information or other calendar element, as described herein, may be stored in, and retrieved from, storage 408 of FIG. 4, or media guidance data source 518 of FIG. 5. Furthermore, processing circuitry, or a computer program, may update configuration data of the media guidance application, which may be stored within storage 408 of FIG. 4 or media guidance data source 518 of FIG. 5.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for automatically detecting schedule-related information in an electronic document, the method comprising:

receiving, via communication circuitry, an electronic document containing a first document object and a second document object defined under a structural document object model;

via control circuitry:

identifying a first text string indicative of first schedule-related information within the first document object and a second text string indicative of second schedule-related information within the second document object;

identifying a first type of the first schedule-related information from the first text string;

identifying a second type of the second schedule-related information from the second text string;

adding the first schedule-related information and information relating to the first document object to a first position in a hierarchical structure and the second schedule-related information and information relating to the second document object at a second position in the hierarchical structure, wherein a relative position between the first position and the second position in the hierarchical structure is indicative of a relationship between the first document object and the second document object in the document;

determining whether the hierarchical structure contains a third position indicative of third schedule-related information of the first type, and determining whether the third position is closer to the second position than the first position in the hierarchical structure;

in response to determining that the hierarchical structure contains a third position indicative of third schedule-related information of the first type and to determining that the third position is closer to the second position than the first position in the hierarchical structure:

identifying the third schedule-related information and the second schedule-related information as relating to a same calendar event; and generating a schedule indicator by combining the third schedule-related information and the second schedule-related information in compliance with a calendar schedule format; and in response to determining that the hierarchical structure contains no third position indicative of schedule-related information of the first type or determining that the third position is not closer to the second position than the first position in the hierarchical structure:

identifying the first schedule-related information and the second schedule-related information as relating to the same event;

generating a schedule indicator by combining the first schedule-related information and the second schedule-related information in compliance with a calendar schedule format; and providing the generated schedule indicator for display at a display device.

2. The method of claim 1, wherein the identifying a first text string indicative of first schedule-related information within the first document object comprises: determining a first type of the first document object;

identifying one or more data formats for the first schedule-related information corresponding to the first type of the first document object;

determining whether the first text string is compliant with at least one of the one or more data formats; and in response to determining that the first text string is compliant with the at least one of the one or more data formats, identifying that the first text string is indicative of first schedule-related information within the first document object.

3. The method of claim 2, wherein the identifying the first type of first schedule-related information from the first text string comprises:

parsing the first text string based on the at least one data format that the first text string is compliant with to determine one or more calendar elements contained in the first text string; and associating a schedule-information type with each of the one or more calendar elements based on the at least one data format.

4. The method of claim 1, wherein the identifying a first text string indicative of first schedule-related information within the first document object comprises:

determining textual content corresponding to the first document object; performing a query within the textual content based on a plurality of previously stored terms relating to a calendar schedule;

in response to the query, detecting the first text string within the first document object contains a first previously stored term relating to first schedule-related information.

5. The method of claim 1, wherein the adding the first schedule-related information and information relating to the first document object to a first position in a hierarchical structure and the second schedule-related information and information relating to the second document object to a second position in a hierarchical structure comprises:

generating a first node corresponding to the first schedule-related information and a second node corresponding to the second schedule-related information;

adding the first node to the hierarchical structure at the first position representing the first type of first schedule-related information and the second node to the hierarchical structure at the second position representing the second type of second schedule-related information; and annotating the first node with information relating to the first document object and a first location of the first document object within the electronic document, and the second node with information relating to the second document object and a second location of the second document object within the electronic document.

6. The method of claim 5, wherein the determining whether the hierarchical structure contains a third position indicative of third schedule-related information of the first type:

locating a third node at a first level where the first node is located in the hierarchical structure;

in response to locating the third node at the first level where the first node is located in the hierarchical structure, retrieving, from the third node, a third location within the electronic document where the third schedule-related information appears; and determining whether the third location is closer to the second location than the first location.

7. The method of claim 6, wherein the determining whether the third location is closer to the second location than the first location comprises:

determining that the third location is within a third document object; and applying a set of pre-defined rules to determine whether the third location is closer to the second location than the first location based on the first document object, the second document object and the third document object.

8. The method of claim 7, further comprising:

determining whether the third location is closer to the second location than the first location by comparing a first count of characters between the first location and the second location and a second count of characters between the third location and the second location.

9. The method of claim 7, further comprising:

in response to determining that the hierarchical structure contains a third position indicative of third schedule-related information of the first type and the third position is closer to the second position than the first position in the hierarchical structure, determining a context of the first document object and second document object based on at least partial content of the first document object and the second document object; and identifying whether the first schedule-related information and second schedule-related information are related to a same event based on the context.

10. The method of claim 1, further comprising:

determining metadata associated with the electronic document;

extracting time information from the metadata;

translating the time information to fourth schedule-related information having a fourth type; and adding the fourth schedule-related information to the hierarchical structure.

11. A system for automatically detecting schedule-related information in an electronic document, the system comprising: communication circuitry; and control circuitry configured to:

receive, via the communication circuitry an electronic document containing a first document object and a second document object defined under a structural document object model;

identify a first text string indicative of first schedule-related information within the first document object and a second text string indicative of second schedule-related information within the second document object;

identify a first type of the first schedule-related information from the first text string; identify a second type of the second schedule-related information from the second text string;

add the first schedule-related information and information relating to the first document object to a first position in a hierarchical structure and the second schedule-related information and information relating to the second document object at a second position in the hierarchical structure, wherein a relative position between the first position and the second position in the hierarchical structure is indicative of a relationship between the first document object and the second document object in the document;

determine whether the hierarchical structure contains a third position indicative of third schedule-related information of the first type, and determining whether the third position is closer to the second position than the first position in the hierarchical structure;

in response to determining that the hierarchical structure contains a third position indicative of third schedule-related information of the first type and to determining that the third position is closer to the second position than the first position in the hierarchical structure:

identify the third schedule-related information and the second schedule-related information as relating to a same calendar event; and generate a schedule indicator by combining the third schedule-related information and the second schedule-related information in compliance with a calendar schedule format; and in response to determining that the hierarchical structure contains no third position indicative of schedule-related information of the first type or determining that the third position is not closer to the second position than the first position in the hierarchical structure:

identify the first schedule-related information and the second schedule-related information as relating to the same event;

generate a schedule indicator by combining the first schedule-related information and the second schedule-related information in compliance with a calendar schedule format; and providing the generated schedule indicator for display at a display device.

12. The system of claim 11, wherein the control circuitry, when identifying a first text string indicative of first schedule-related information within the first document object, is configured to:

determine a first type of the first document object;

identify one or more data formats for the first schedule-related information corresponding to the first type of the first document object;

determine whether the first text string is compliant with at least one of the one or more data formats; and in response to determining that the first text string is compliant with the at least one of the one or more data formats, identify that the first text string is indicative of first schedule-related information within the first document object.

13. The system of claim 12, wherein the control circuitry, when identifying the first type of first schedule-related information from the first text string, is configured to:

parse the first text string based on the at least one data format that the first text string is compliant with to determine one or more calendar elements contained in the first text string; and associate a schedule-information type with each of the one or more calendar elements based on the at least one data format.

14. The system of claim 11, wherein the control circuitry, when identifying a first text string indicative of first schedule-related information within the first document object, is configured to:

determine textual content corresponding to the first document object;

perform a query within the textual content based on a plurality of previously stored terms relating to a calendar schedule;

in response to the query, detect the first text string within the first document object contains a first previously stored term relating to first schedule-related information.

15. The system of claim 11, wherein the control circuitry, when adding the first schedule-related information and information relating to the first document object to a first position in a hierarchical structure and the second schedule-related information and information relating to the second document object to a second position in a hierarchical structure, is configured to:

generate a first node corresponding to the first schedule-related information and a second node corresponding to the second schedule-related information;

add the first node to the hierarchical structure at the first position representing the first type of first schedule-related information and the second node to the hierarchical structure at the second position representing the second type of second schedule-related information; and annotate the first node with information relating to the first document object and a first location of the first document object within the electronic document, and the second node with information relating to the second document object and a second location of the second document object within the electronic document.

16. The system of claim 15, wherein the control circuitry, when determining whether the hierarchical structure contains a third position indicative of third schedule-related information of the first type, is configured to:
  locate a third node at a first level where the first node is located in the hierarchical structure;
  in response to locating the third node at the first level where the first node is located in the hierarchical structure, retrieve, from the third node, a third location within the electronic document where the third schedule-related information appears; and
  determine whether the third location is closer to the second location than the first location.

17. The system of claim 16, wherein the control circuitry, when determining whether the third location is closer to the second location than the first location, is configured to:
  determine that the third location is within a third document object; and apply a set of pre-defined rules to determine whether the third location is closer to the second location than the first location based on the first document object, the second document object and the third document object.

18. The system of claim 17, wherein the control circuitry is further configured to:
  determine whether the third location is closer to the second location than the first location by comparing a first count of characters between the first location and the second location and a second count of characters between the third location and the second location.

19. The system of claim 17, wherein the control circuitry is further configured to:
  in response to determining that the hierarchical structure contains a third position indicative of third schedule-related information of the first type and the third position is closer to the second position than the first position in the hierarchical structure,
  determine a context of the first document object and second document object based on at least partial content of the first document object and the second document object; and
  identify whether the first schedule-related information and second schedule-related information are related to a same event based on the context.

20. The system of claim 11, wherein the control circuitry is further configured to:
  determine metadata associated with the electronic document; extract time information from the metadata;
  translate the time information to fourth schedule-related information having a fourth type; and
  add the fourth schedule-related information to the hierarchical structure.

* * * * *